DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1365

T889,016

PHOTOGRAPHIC MATERIALS

Earl J. Van Lare, Rochester, and Arthur Fumia, Jr., Hilton, N.Y. (both of Kodak Park, Rochester, N.Y. 14650)

Filed Sept. 25, 1970, Ser. No. 75,786
**Int. Cl. G03c *1/14***
U.S. Cl. 96—127
No Drawing. 39 Pages Specification

This disclosure relates to novel dyes and photographic materials. In one aspect it relates to photographic silver halide emulsions spectrally sensitized with cyanine and hemicyanine dyes having a tertiary aminoalkyl group substituted on the heterocyclic nitrogen atom of the basic nucleus. In one preferred embodiment, unsymmetrical cyanine dyes are provided comprising first and second nuclei joined by a linkage selected from a trimethine linkage and a pentamethine linkage; the first nucleus being a nitrogen-containing basic heterocyclic nucleus of the type used in cyanine dyes, said hetero-nitrogen atom having attached thereto a tertiary aminoalkyl group; and the second nucleus being a nitrogen-containing basic heterocyclic nucleus of the type used in cyanine dyes, said hetero-nitrogen atom having attached thereto an alkyl group. Highly useful photographic spectral sensitizing symmetrical cyanines and hemicyanines are also provided. Typical useful dyes have one of the following formulas:

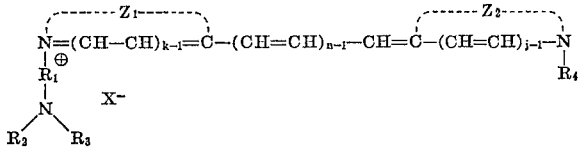

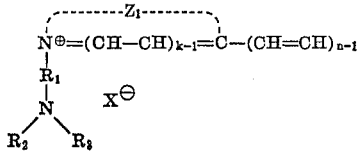

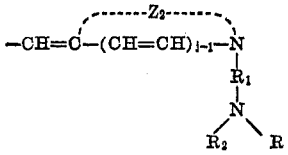

or

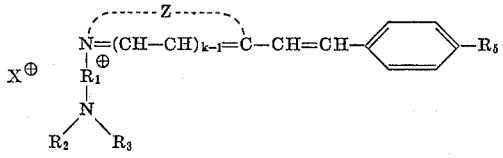

wherein $n$ represents 1 to 3, $k$ and $j$ each represents 1 or 2; $Z_1$ and $Z_2$ each represents the non-metallic atoms required to complete a 5- to 6-membered nitrogen-containing basic heterocyclic nucleus; $R_1$ represents an alkylene group containing from 2 to 6 carbon atoms; $R_2$ and $R_3$ each represents a member of the group consisting of alkyl, aryl and, $R_2$ or $R_3$ taken together, represent the atoms to complete, with the nitrogen atom to which they are attached, a heterocyclic nucleus containing from 5 to 6 atoms; $R_4$ represents an alkyl group or an aryl group; $R_5$ represents halogen, nitro, cyano or amino; Z represents the atoms required to complete a basic heterocyclic nucleus; and X represents an acid anion. A typical useful dye is 5-chloro-1,3′-diethyl-3-(2-morpholinoethyl)benzimidazolothiacarbocyanine iodide.